United States Patent [19]
Randolph et al.

[11] 3,774,578
[45] Nov. 27, 1973

[54] POULTRY HANDLING APPARATUS

[76] Inventors: Arthur J. Randolph, 4711 Sonoma Hwy.; Albertus G. Horsting, 6685 Sonoma Hwy., both of Santa Rosa, Calif. 95405

[22] Filed: Dec. 15, 1972

[21] Appl. No.: 315,421

[52] U.S. Cl............................................. 119/97 R
[51] Int. Cl........................................... A01k 37/00
[58] Field of Search...................... 119/97 R; 17/11

[56] References Cited
UNITED STATES PATENTS

| | | | |
|---|---|---|---|
| 2,161,020 | 6/1939 | Crooks | 119/97 R |
| 2,484,088 | 10/1949 | Hayes | 119/97 R |
| 3,623,186 | 11/1971 | Panek | 17/11 |
| 2,713,325 | 7/1955 | Bowers | 119/97 R |

*Primary Examiner*—Hugh R. Chamblee
*Attorney*—Alvin E. Hendricson et al.

[57] ABSTRACT

A power operated apparatus for gripping and transferring birds, such as turkeys and other poultry, between successive stations for facilitating operations thereon such as vaccination and artificial insemination. Provision is made for gripping or holding the birds in relatively normal position, particularly for insemination and for automatically releasing the birds at an exit station.

19 Claims, 11 Drawing Figures

Patented Nov. 27, 1973

Patented Nov. 27, 1973

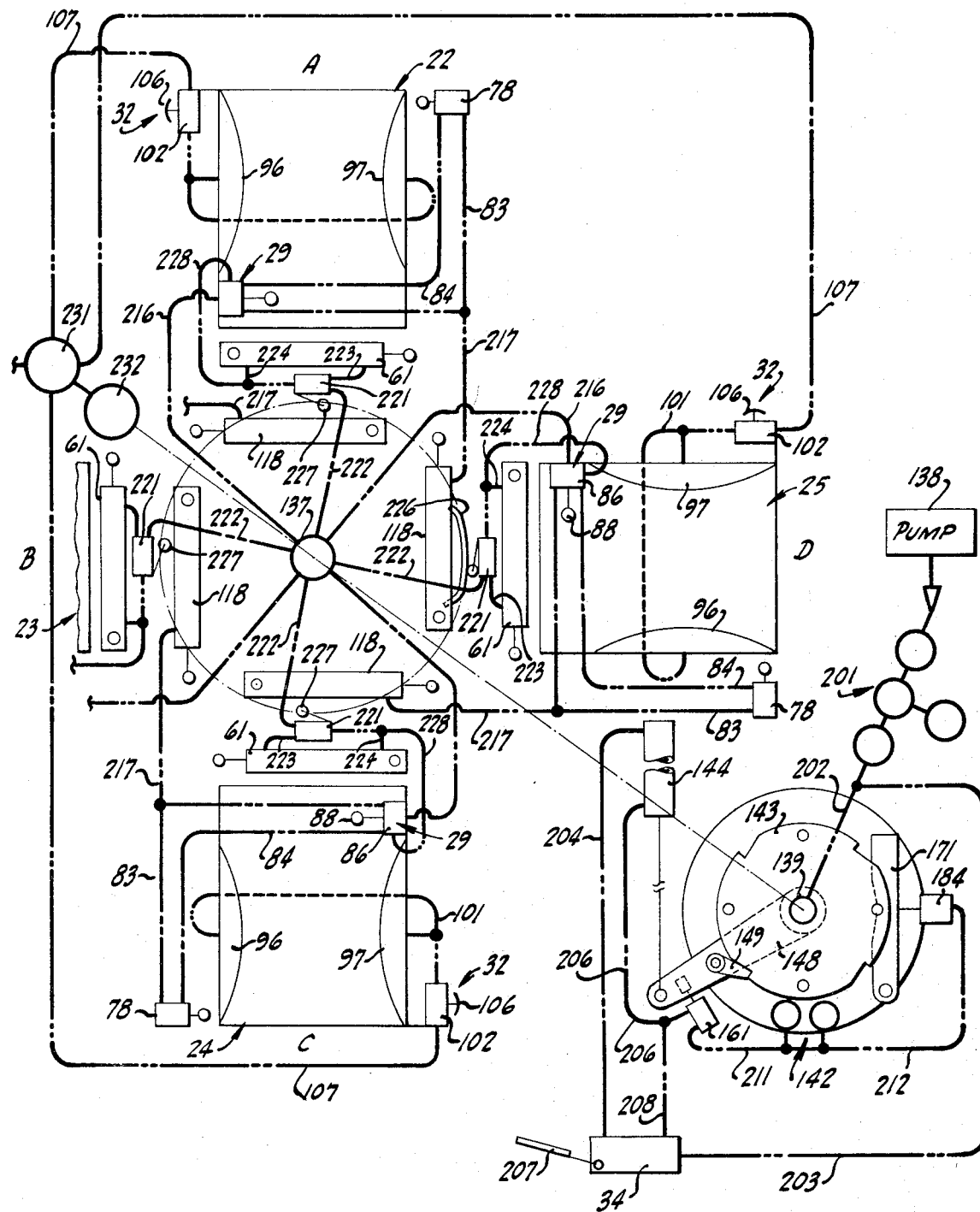

POULTRY HANDLING APPARATUS

BACKGROUND OF INVENTION

In the commercial production of birds such as turkeys for slaughter and sale, it is commonplace to raise the birds in very large flocks and to relatively carefully control all facets of the growth, feeding and care of the birds. Considering particularly the field of turkey growing, it is noted that various operations are normally performed upon the turkeys such as, for example, vaccination of the turkeys and artificial insemination of the hens. In order to perform artificial insemination it is necessary for the turkey hen to be manually gripped or held so that an operator may then insert the semen for insemination. While this operation is normally performed by trained operators, it is recognized that the operation is quite time-consuming and may also be harmful to the turkey hens. A certain amount of physical handling or manhandling of the hen is necessary and this may result in damage to the bird or, at least, a reduction in egg production or laying of unusable eggs.

The present invention provides for mechanization of a substantial portion of at least certain operations normally performed upon turkeys or the like. The apparatus of the present invention is adapted to grip a turkey, for example, and hold the turkey in a relatively normal position for the turkey and then to transport the turkey to one or more operating stations and thence to an exit station whereat the turkey is released. Substantially all physical handling of the bird is eliminated by the present invention so that deleterious physical and mental effects upon the bird are minimized.

SUMMARY OF INVENTION

The present invention provides apparatus for gripping and holding a bird such as a turkey in a generally horizontal position and also provides for transferring the bird in such position from an entry station to one or more operation stations and thence to an exit station whereat the bird is released.

In accordance with the present invention, the bird is held upon a generally horizontal bed by means gripping the lower legs of the bird against the bed and applying a weight to the back of the bird pressing the chest of the bird against the bed. At an insemination operation station of the present invention provision is made for resiliently applying side pressure to the bird for raising the rump thereof to properly condition the bird for artificial insemination. The invention furthermore provides for releasing the grip on the lower legs of the bird and pivoting apart two halves of the bed upon which the bird rests at the exit station so that the bird actually descends from the station in position to walk away from the apparatus hereof.

With regard to the control of the apparatus of the present invention, it is noted that same is power driven as, for example, by pneumatics. At the entry station there is provided a manual valve employed by an operator placing the bird upon a bed at this station. This valve clamps the lower legs of the bird and applies a weight to the back of the bird so that the bird is then firmly held on the bed. At an operating station there is provided a manually operated valve or control for moving the transport mechanism to place successive birds at the operating station. Also at this operating station there is provided a manually operable valve or control means for exerting side pressure on the bird held thereat in order to properly condition the bird for artificial insemination. At or adjacent to the exit station there is provided automatically operated control means for releasing the grip upon the bird and pivoting apart the two halves of the bed on which the bird rests.

The transport of the present invention is preferably provided as a rotary motion so that the stations identified above are actually circumferentially spaced about a circle. The mechanism hereof provides a positive movement of beds from one station to another with breaking means operable to prevent a sudden stop of the mechanism when a bed is aligned with a station and positive locking means for insuring exact location of successive beds at each station. The entire invention is directed to gentle handling of birds carried by the apparatus and it has been found that a turkey hen, for example, placed in the present apparatus and moved through the successive stations thereof does not even become excited.

DESCRIPTION OF FIGURES

The present invention is illustrated as to a single preferred embodiment thereof in the accompanying drawings wherein:

FIG. 11 is a schematic illustration of pneumatic connections of elements of the present invention.

DESCRIPTION OF PREFERRED EMBODIMENT

A preferred embodiment of the present invention is adapted for use with turkey hens and thus the following description is referenced to this application, although it is to be appreciated that the invention is also adapted for use with other fowl. It is furthermore noted that the present invention is particularly adapted to improvements in artificial insemination of fowl, although other and alternative operations upon fowl may be performed at the operating stations of the present invention.

Figure 1:
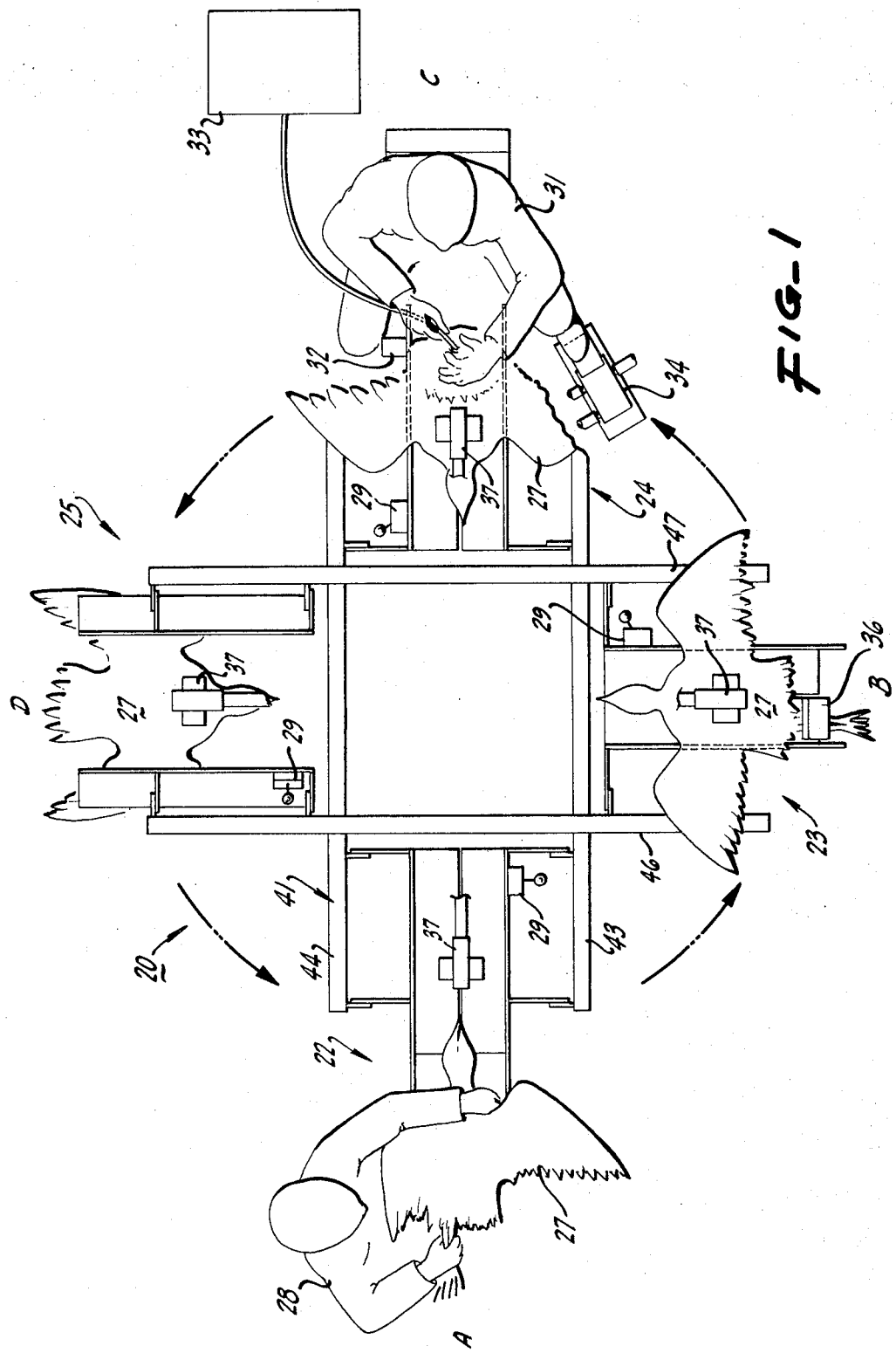
FIG. 1 is a schematic plan view of the apparatus of the present invention and illustrating placement of a turkey hen on the apparatus, movement of the hen, artificial insemination of the hen on the apparatus, and release of the hen from the apparatus.

A general understanding of the present invention may be best obtained by reference to FIG. 1 and the following brief description thereof. As shown in FIG. 1, there is provided a rotary mounted structure 21 having four orthogonally disclosed carriages 22, 23, 24 and 25 disposed thereon. The carriages are orthogonally disposed on the structure 21 in extension outwardly therefrom. In FIG. 1 the four carriages are illustrated to be disposed one at each of four stations which may be identified as follows: loading station A, first operating station B, second operating station C, and discharge station D.

Before considering details of construction, it is briefly noted that operation of the present invention is accomplished by first manually placing a turkey 27 in the carriage 22 at the loading station A. An operator 28 places the turkey on the carriage and then actuages control means 29 which operates gripping means to be described below for holding the turkey substantially immobile on the carriage. The structure 21 is then rotated 90° so that the turkey is disposed at operating station B. With the structure in this rotated position, another bird is then loaded at station A and the bird at station B may be operated upon as, for example, to vaccinate the bird. The apparatus is then rotated a further 90° to dispose a bird at operating station C whereat artificial insemination of the bird may be carried out. An operator 31 at station C may actuate side pressure control means 32 to properly condition the bird on the carriage so that artificial insemination means 33 may be employed by the operator 31. At the conclusion of this insemination operation, operator 31 actuates transport control means 34 to rotate the structure a further 90°. As a carriage 25 rotates to station D, automatic control means releases the bird and pivots the bottom of the carriage 25 apart so that the bird descends from the carriage to land on its feet in position to walk away from the apparatus.

It is briefly noted at this point that the turkey is held in position on a carriage by gripping or clamping means 36, generally illustrated at station B, and a back weight 37. The turkey is placed on the carriage resting on its stomach and breast with the legs extending radially outward of the carriage and the wings are spread over the side of the carriage. The control means 29 are then operated to actuate the clamping means 36 to grip the lower legs of the bird firmly and these control means furthermore release the back weight 37 which pivots downwardly on to the back of the bird to urge the body of the bird against the carriage bed. In this position the bird is comfortably restrained in a relatively natural position for the bird so that operations upon the bird at stations B and C are facilitated.

The bird is fully restrained by the apparatus of the invention so that it is not necessary for an operator to physically engage the bird in any way other than to perform such operations as may be desired. It is also noted that the operation performed at station C is herein considered to be the most time-consuming so that the operator 31 thereat is provided with the transport control means 34. It is under the control of the operator 31 that the apparatus is rotated or indexed to move successive carriages to the next station.

The foregoing brief description of apparatus and operation thereof is intended to provide an appropriate setting for the following description of mechanical details of a preferred embodiment of the present invention. It is, however, to be borne in mind that the present invention is not limited to particular motions nor manners of accomplishing such motions. It is, however, advantageous for the transport mechanism of the present invention to move individual carriages about a circle and thus to define the various stages of the present invention at predetermined points about the circumference of such circle. The general objectives and advantages of the present invention are believed to be at least noted in the preceding general description of apparatus operation and there now follows a more detailed description of particular structure and mechanisms adapted to carry out the present invention.

Figure 2:
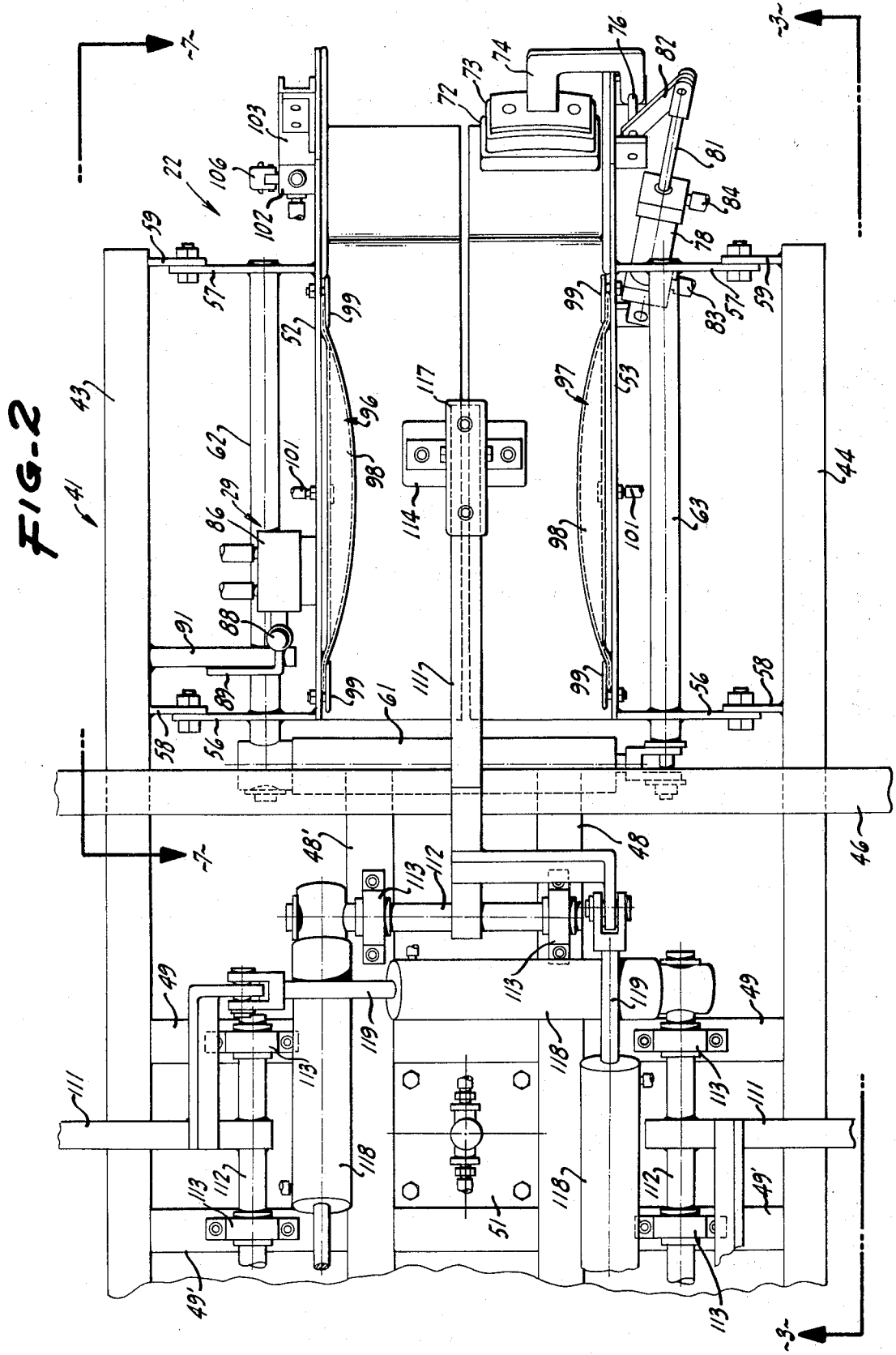
FIG. 2 is a top plan view of one bird carriage including bird gripping means and actuators therefor.
Figure 3:
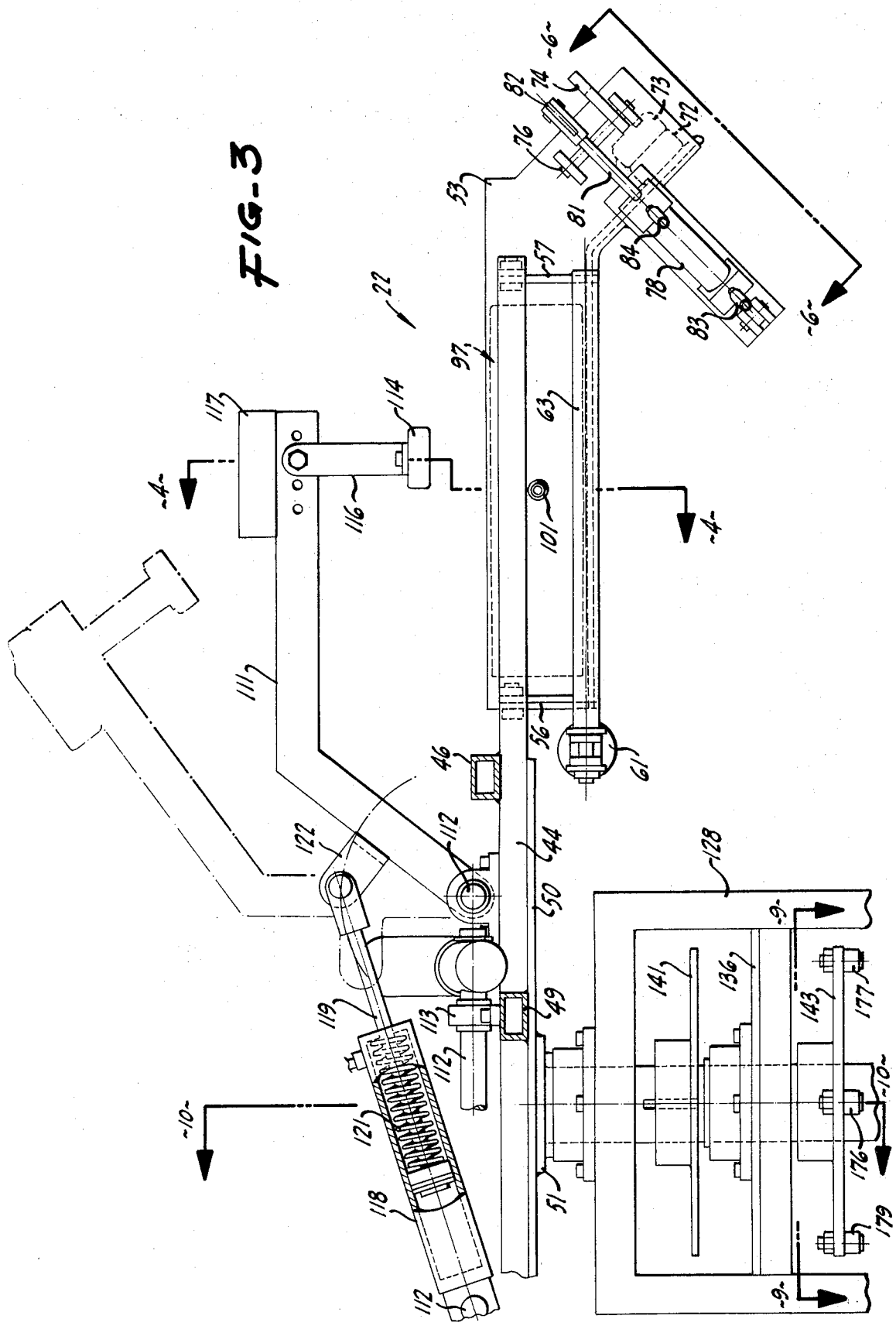
FIG. 3 is a side elevational view of the carriage of FIG. 2 and a portion of the central mounting and drive structure taken in plane 3—3 of FIG. 2.

Reference is made to FIGS. 2 and 3 illustrating in plan and elevation, respectively, a carriage 22 of a preferred embodiment of the present invention. It is first noted that the carriages are mounted upon a framework 41 that, in turn, is secured to and rotated with a central vertical shaft 42 of the apparatus. The framework 41, as illustrated, is comprised of a first pair of spaced parallel beams 43 and 44 disposed on each side of the central shaft 42 and a second pair of spaced parallel beams 46 and 47 disposed on opposite sides of the central shaft perpendicularly to the first pair of beams. In practice the elements of the framework may be primarily comprised of steel box beams welded together to form a rigid structure. The aforementioned beams of the framework may be mojnted for rotation with the central shaft 42 by means of a first pair of parallel beams 48 – 48' secured between the beams 46 and 47 in perpendicular relationship thereto and a second pair of interior parallel beams 49 – 49' secured between the outer beams 43 and 44 and connected to the other interior beams 48 – 48'. The foregoing framework structure will be seen to form somewhat of a crisscross arrangement and the interior beams 48 – 48' are mounted on a plate 50 that is in turn secured to a top plate 51 affixed to the top of the central vertical shaft 42 so that the entire framework is then rigidly affixed to the shaft for rotation therewith.

Figure 4:
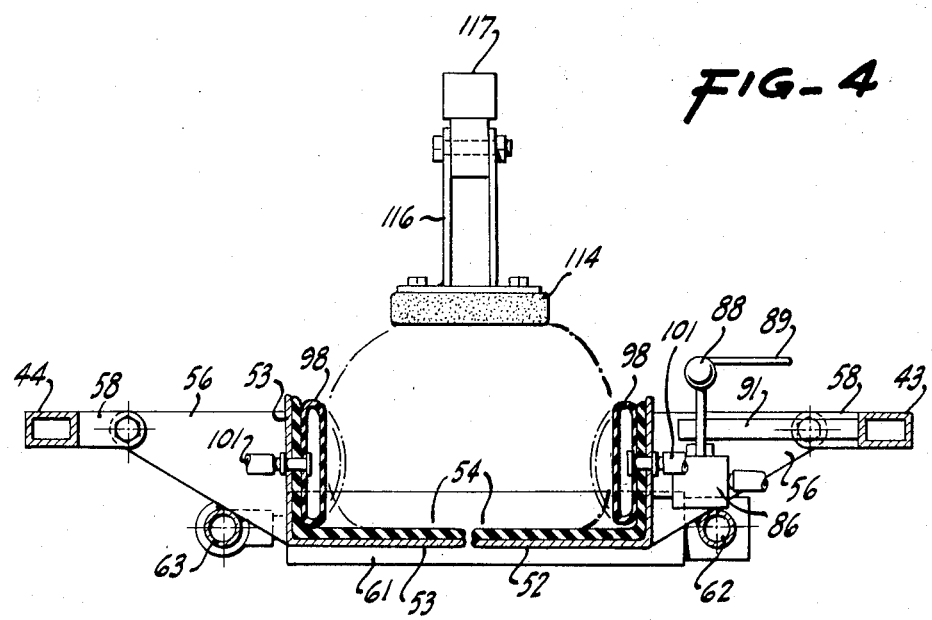
FIG. 4 is a transverse sectional view of a carriage taken in the plane 4—4 of FIG. 3.
Figure 5:
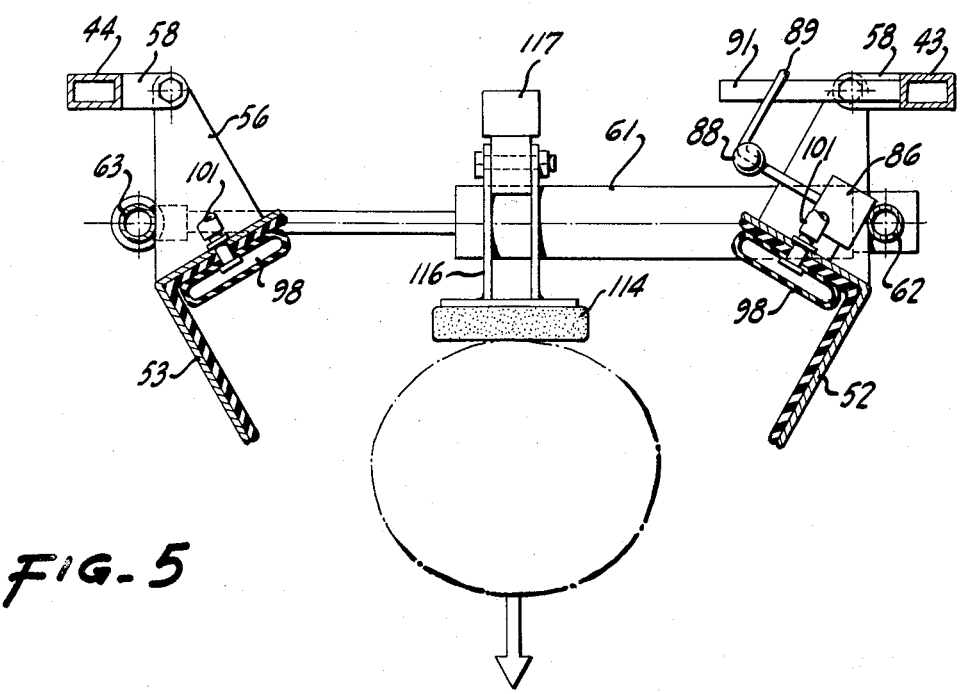
FIG. 5 is a sectional view taken in the same plane as FIG. 4 and illustrating the carriage in release position.

The carriage 22 is mounted between the portions of the beams 43 and 44 extending beyond the framework beam 46 and is comprised primarily of two facing L-shaped plates 52 and 53, as shown in FIGS. 4 and 5. The L-shaped plates 52 and 53 are disposed to form an open topped channel with the edges of the lower portions of the plates substantially spaced abutting over the lengths thereof to form a carriage bed or cradle 54 upon which a turkey or the like may be placed. The upright portions of these plates form the sides of the carriage bed. The carriage plate 53, for example, is mounted upon a pair of side plates 56 and 57 extending outwardly therefrom into pivotal engagement with a pair of brackets 58 and 59 secured to the framework beam 44. The plate 52 is similarly mounted by side plates pivotally engaging brackets on the framework beam 43.

Provision is made for pivoting the carriage plates 52 and 53 between a closed bed position and open bed position. This may be accomplished by a pneumatic cylinder 61 having one cylinder end rotatably secured to a pivot bar 62 and the piston rod extending from the other end rotatably secured to a second pivot bar 63. The first pivot bar 62 is secured to the side plates of carriage plate 52 and pivot bar 63 is secured to the side plates 56 and 57 of the carriage plate 53. The pivot bars are secured to the side support plates of the carriage bed below the pivotal connections of these support plates to the framework. Consequently operation of the cylinder 61 to extend the piston rod therefrom will pivot the carriage plates 52 and 53 apart, as illustrated in FIG. 5. Operation of the cylinder 61 in the opposite direction to withdraw the piston rod into the cylinder housing will pivot the carriage plates 52 and 53 back into a normal closed position, as illustrated in FIG. 4. The carriage bed is normally closed, as illustrated in FIG. 4, and is only opened, as illustrated in FIG. 5, when the carriage reaches the unloading station D, as further described below.

In order to properly position the turkey, for example, upon a carriage of the present invention, it is desirable that the legs of the turkey extend downwardly at an angle to the body of the turkey. This is accommodated in the present invention by turning down the outer ends of the carriage plates 52 and 53. This is illustrated in FIG. 3 wherein it will be seen that the carriage plates have at least the lower portion thereof inclined downwardly at an angle of about 45° over the outer quarter of the length thereof.

Figure 6:
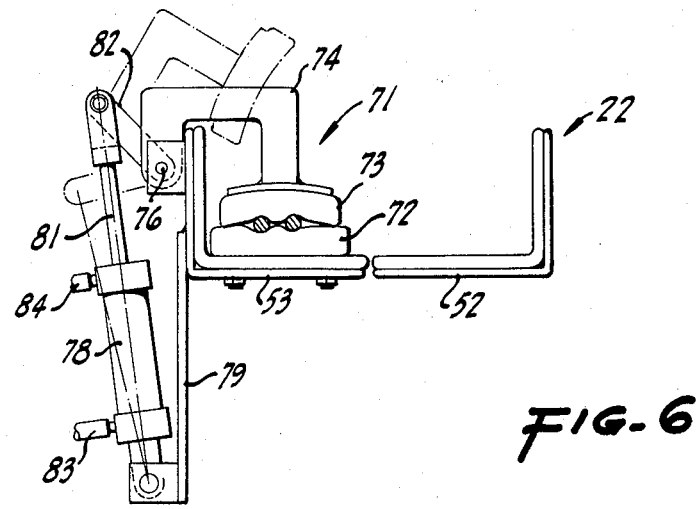
FIG. 6 is an elevational view taken in the plane 6—6 of FIG. 3 and illustrating the outer end of the carriage with bird gripping means illustrated by solid lines in actuated position and by phantom lines in release position.

Each of the carriages of the present invention is provided with means 36 for gripping or clamping a turkey or the like in position upon the carriage bed. With regard to these gripping means, reference is made to FIGS. 2, 3 and 6 illustrating the clamping means 36 as including a lower pad 72 mounted on the outer extremity of the lower portion of carriage plate 53 and a pivotally mounted upper pad 73 adapted to engage the upper surface of the lower pad. The upper pad 73 is carried by a U-shaped arm 74 extending over the upper edge of carriage plate 53 and downwardly into fixed engagement with a short shaft 76 mounted for rotation in a bracket 77 secured to the outer side of the carriage plate 53. A pneumatic cylinder 78 has the housing thereof pivotally mounted to a bracket 79 secured to the side of the carriage plate 53 and depending therefrom. A piston rod 81 of the cylinder 78 extends upwardly from the cylinder and is connected by a pivotal link 82 to pivot shaft 76. This link 82 is fixed to the shaft and is pivotally connected to the end of the piston rod.

The illustration in FIG. 6 shows the clamping means 36 in clamping position, i.e., with the upper pad 73 pressed downward against the lower pad 72 so as to firmly clamp the lower legs of a turkey therebetween. In this position the cylinder 78 is actuated to extend the piston rod 81 therefrom. Operation of the cylinder 78 to withdraw the piston rod into the cylinder will be seen to rotate the pivot shaft 76 and, consequently, to pivot the U-shaped arm 74 to the left in FIG. 6 and, consequently, to raise the upper pad 73. This raised or unclamped position of the clamping means 36 is illustrated in phantom in FIG. 6. The pivotal mounting of the lower extremity of the cylinder 78 allows this cylinder to rotate somewhat during the movement of the clamping means as is required by the linkage illustrated. The cylinder 78 is controlled and operated through pneumatic lines 83 and 84 from control means 29.

Figure 7:
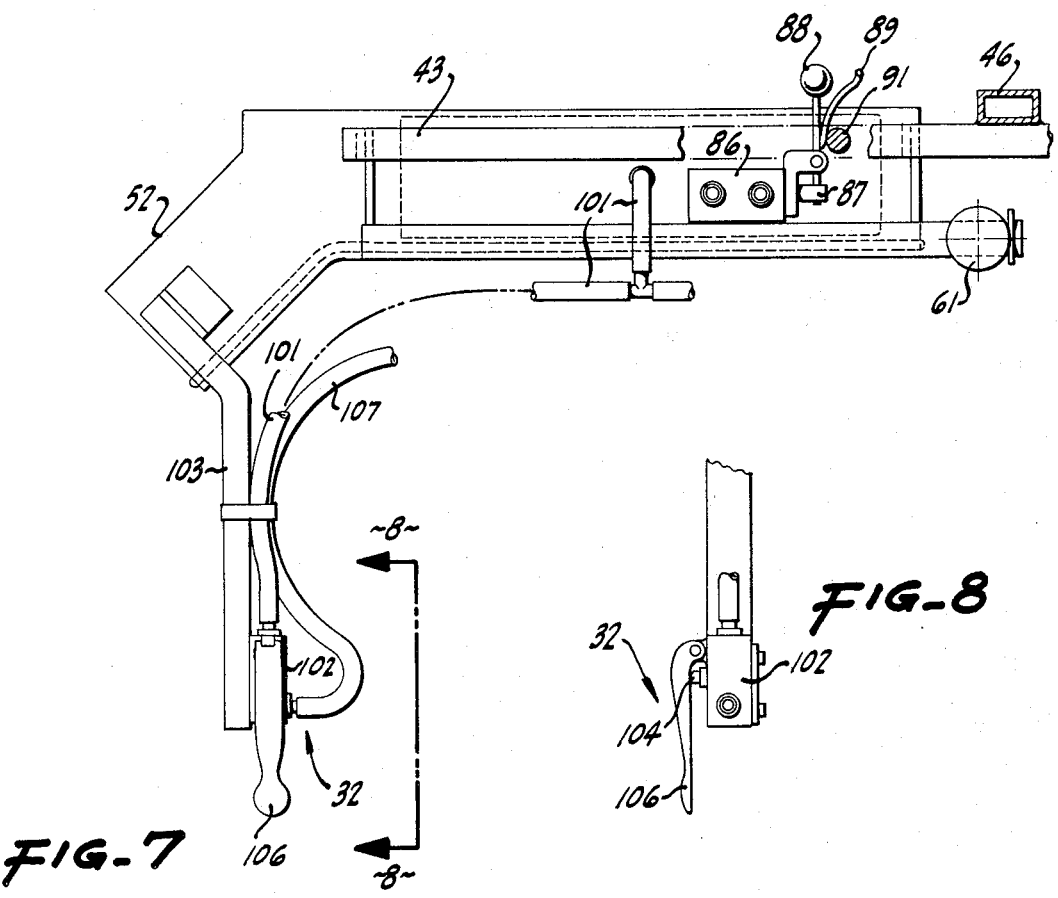
FIG. 7 is a partial elevational view of a carriage taken in the plane 7—7 of FIG. 2 and particularly illustrating the side pressure control means.

The control means 29 for the clamping means 36 is illustrated, for example, in FIGS. 2, 4, 5 and 7, and will be seen to comprise a pneumatic valve 86 having the housing thereof mounted on the upright exterior side of the carriage plate 52 near the inner end thereof. As shown in FIG. 7, the valve 86 has an actuator 87 extending forwardly therefrom toward the front end of the carriage with a valve arm 88 extending upwardly from the actuator and having a knob thereon disposed slightly above the upper edge of the carriage plate 52. Control means 29 is operated to actuate cylinders 78 for closing the clamping means 36 by moving the valve arm 88 forwardly in FIG. 7, i.e., toward the central portion of the apparatus hereof. It will be appreciated that the leg clamping means may be disposed on either the left or the right side of the carriage and also that resilient pads are provided thereon to firmly clamp the legs without damage. Provision is also made for automatically operating the cylinder 78 in the opposite direction to pivot the clamping means 36 to an open position. This is readily provided herein by attaching a small bar 89 to the valve arm 88 with this bar curving upwardly and toward the inner end of the carriage and thence bent to extend laterally outward of the carriage, as illustrated in FIGS. 4 and 7, for example. There is furthermore provided for this same purpose a fixed bar 91 secured to the framework beam 43 and extending laterally of the carriage 22 toward the side of carriage plate 52 ahead of the valve 86. The relative locations of the rod 89 and bar 91 may be seen in FIGS. 2, 4, 5 and 7. In the closed position of the carriage bed, this rod 89 merely extends forwardly and laterally outward of the valve arm 88. When the carriage bed is pivoted open as, for example, in the position of FIG. 5, the carriage plate 52 carrying the valve 86 is pivoted downwardly so that the bar 89 riding on the fixed rod 91 moves the valve actuator 87 into the valve 86 to reverse the position thereof. The lateral extension of the rod 89 provides for maintaining the contact between bar and rod as the carriage plate pivots downwardly. Thus it will be seen that, as the carriage bed is pivoted into an open position, the clamping means 71 are also opened to thus fully release a turkey disposed on the bed.

Additional turkey retaining means are provided in connection with each carriage of the apparatus. However, before proceeding with a description of same, it is convenient to note the means for applying a resilient side pressure to turkeys retained in each bed inasmuch as such means are actually mounted on the bed. Referring to FIGS. 2, 4, 7 and 8, there will be seen to be provided a pair of bladders or the like 96 and 97 mounted on the inner, upright portions of the carriage plates 52 and 53, respectively. These bladders are identically formed and the bladder 96, for example, may comprise a flat, resilient, closed tube 98 secured to the inner, upright surface of the carriage plate 52 as by end plates 99. An air line 101 extends through the upright side of the carriage plate 52 into connection with the interior of the tube 98 for application of air pressure into the tube to inflate the same.

Figure 8:
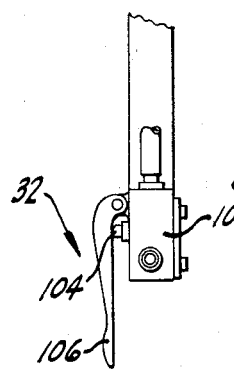
FIG. 8 is a side elevational view of the control means of FIG. 7 and taken in the plane 8—8 of FIG. 7.

The bladders 96 and 97 are operated or actuated by the control means 32, illustrated in some detail in FIGS. 7 and 8. The control means include a pneumatic valve 102 mounted upon a bar 103 secured to and depending from the outer end of the carriage plate 52. A valve actuator 104 extends from the front face of the valve and is operated by an elongated arm 106 pivoted on the valve housing above the actuator and depending past the actuator 104. The air lines 101 from the bladders 96 and 97 extend to the valve 102 and an inlet air line 107 is also connected to the valve. The side pressure, by means of the bladders, is applied by an operator at the operating station C, for example, by exerting a pressure on the valve arm 106 to operate the valve. In the particular structure illustrated, the operator, assumed to be seated, may operate the valve by knee pressure on the arm 106. It will be noted that the valve is arranged so that the depending arm 106 is disposed on the lateral side of the carriage below same. Thus, as shown in FIG. 1, the operator may readily actuate the valve to inflate the bladders to exert the desired side pressure on the turkey. It is briefly noted at this point that this resiliently applied side pressure is quite advantageous in conditioning the bird so that the operator is able to open the oviduct to facilitate the insemination process.

Considering now the further restraint of a turkey placed in a carriage of the present invention, reference is made to FIGS. 2, 3, 4 and 5. In addition to clamping of the lower legs of the turkey as described above, it is provided herein that a weight shall be placed upon the back of the turkey resting on the carriage bed. Above the carriage bed 22, for example, there is provided crank arm 111 secured to a pivot shaft 112 mounted in bearings 113 upon the framework beams 48 – 48'. As shown in FIG. 3, this crank arm 111 extends upwardly at an angle toward the carriage from the shaft 112 and includes a horizontal portion extending above the center of the carriage. Toward the outer end of the arm 111 there is mounted a back pad 114 by plates 116 secured to the arm and depending therefrom. The outer end of the crank arm 111 is weighted as, for example, by securing a weight 117 thereto; however, it is to be appreciated that the arm itself may be formed with the desired weight integrally thereof at the outer end. The depending plates 116 may be secured to the crank arm in such a manner as to be adjustably positioned at a variable distance from the outer end of the arm so that the back pad 114 when lowered will rest upon the desired portion of the turkey anatomy.

The back weight structure described immediately above is operated by a pneumatic cylinder 118 having the housing thereof pivotally mounted on the framework 41 and a piston rod 119 extending into pivotal engagement with a lug 122 on the upper surface of the inclined portion of the crank arm 111. This lug 122 may be formed as an L-shaped plate, as illustrated in FIG. 2, in order that the pneumatic cylinder may be arranged in parallelism with the crank arm, but laterally displaced therefrom. In practice the cylinder 118 may, in fact, be mounted upon the pivot shaft of the crank arm extending above the opposite carriage. The back weight mechanism pivots downwardly by virtue of the weighted outer end thereof and it is the force of this weight that is actually applied via the pad 114 to back of the turkey hen placed on the carriage beneath the back weight. The back weight is raised upwardly to the position illustrated in phantom in FIG. 3 by operation of the pneumatic cylinder 118 to draw the piston rod 119 into the cylinder. The weight is lowered by releasing the air pressure in the cylinder 118 so that the crank arm pivots in a clockwise direction as illustrated in FIG. 3. There is furthermore provided in connection with this back weight a compression spring 121 disposed in the cylinder 118 between the piston therein and the outer end of the cylinder. The force of this spring is not sufficient to prevent the back weight from pivoting downwardly into illustrated position. The spring force comes into effect when a turkey is released from the carriage to descend therefrom, as this allows the back weight to pivot even further in a clockwise direction to additionally compress the spring and thus slow down the back weight movement until the weight substantially equals the compressed spring force. Return of the back weight to raised position from fully pivoted position is accomplished by the pneumatic cylinder 118 as described above. The spring 121 serves a further function of modifying somewhat the downward force of the back weight mechanism upon the back of the turkey hen. This force is applied somewhat resiliently because of the spring 121 and it has been found that this closely simulates the force applied by a tom turkey to a turkey hen during mating thereof.

The present invention provides, in addition to the elements of structure described above, means for angularly indexing or rotating the device to place successive carriages at each station of the device as generally described with respect to FIG. 1. Considering now the rotary motion of the apparatus, reference is made to FIGS. 9 and 10 wherein there is illustrated a frame 126 including a pair of vertical channels 127 and 128 disposed in facing relation on opposite sides of the central vertical shaft 42. Angle irons 129 extend between the tops of the channels and are welded thereto while the bottoms of the channels are secured as by welding, to a base. The shaft 42 is mounted for rotation in the frame 126 by means of an upper bearing 131 mounted on a plate 132 secured to the top of the frame and a lower bearing 133 mounted on a plate 134 secured to central cross pieces 136 of the frame. These bearings 131 and 133 not only rotatably mount the shaft, but also vertically support the shaft as by engaging circumferential indentations or collars thereabout in conventional manner. The shaft 42 is formed with a hollow core through which there is extended an air line 137 connecting to an air pump 138 at the bottom of the shaft and extending upwardly from the top of the shaft through the upper plate 51 for the connection of branch air lines in turn connected to valving and pistons of the present invention, as described in more detail below. Pneumatic connection for the drive means and related elements may include a swivel joint and tubing 139 connecting to the pump 138.

Provision is made for braking rotary motion of the shaft 42 and to this end there is shown to be provided a brake disc 141 together with pneumatically operated braking means 142 mounted on the frame and adapted to engage the brake disc. As noted above, the upper framework 41 of the present invention which carries the carriages of the apparatus is secured to and rotates with the upper plate 51 that is, in turn, attached to the central shaft 42. Controlled rotary motion of the shaft 42 is herein accomplished by means illustrated in FIGS. 9 and 10 and including a circular drive plate 143 attached to this shaft and extending radially thereabout. This drive plate 143 is rotated by means of a pneumatic drive cylinder 144 pivotally mounted at the outer end of the cylinder to a bracket 146 secured to and extending laterally from the upright frame 126. The cylinder 144 is positioned to direct the piston rod 147 thereof generally toward the periphery of the drive plate 143 in the same plane as the drive plate. The outer end of the piston rod 147 is pivotally connected to a drive bar 148 mounted for rotation about the shaft 42 beneath the drive plate and extending radially outward thereof.

Upon the outer end of this drive bar 148 there is pivotally mounted a pawl 149 positioned to engage anyone of four radial shoulders 151, 152, 153 or 154 orthogonally disposed about the periphery of the drive plate 143. In order to maintain contact between the pawl 149 and a shoulder 151, for example, of the drive plate, there is mounted upon the drive bar 148 a compression spring 157 compressed between an upright outer lug 158 and a back surface of the pawl to urge the pawl generally radially inward of the drive plate. This outer lug 158 also carries or includes an extension 159 directed generally peripherally of the drive plate in a direction away from the drive piston and serving as a valve actuator for control of certain operations of the present apparatus, as described below.

Figure 9:
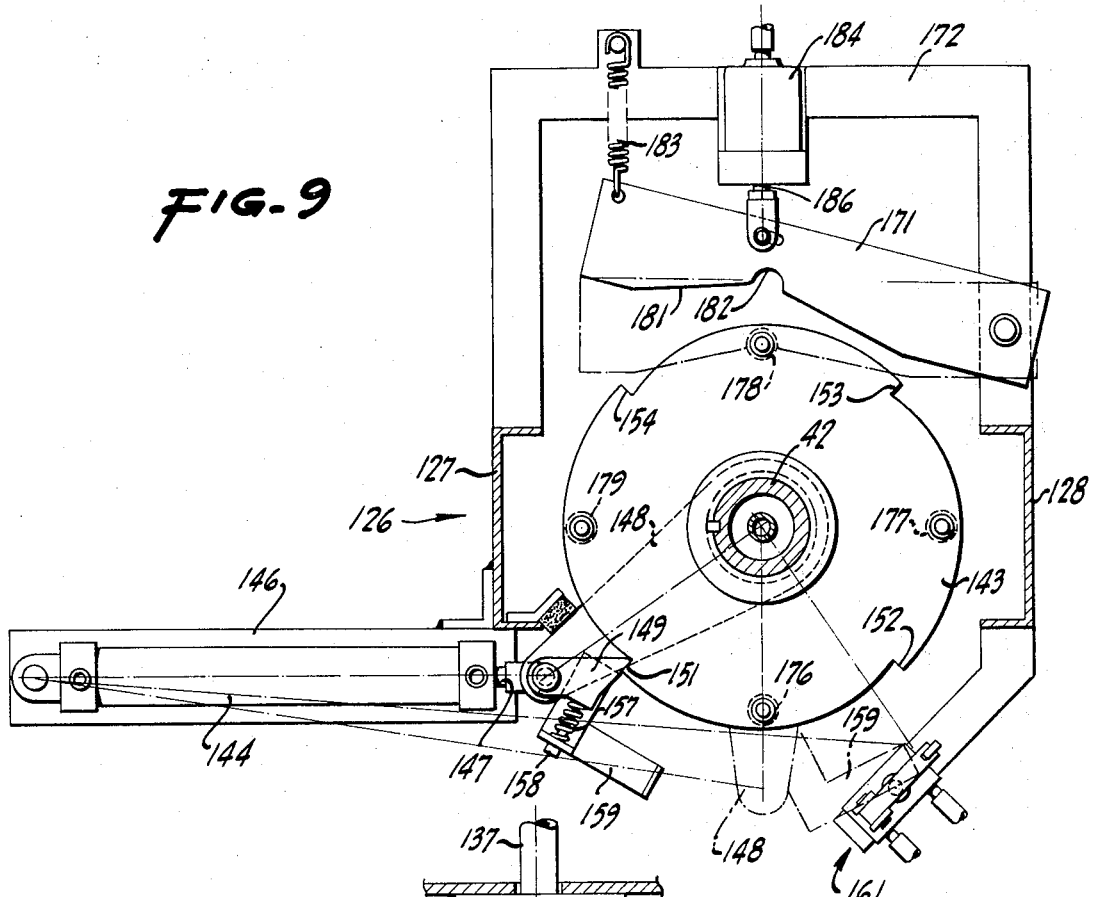
FIG. 9 is a horizontal sectional view taken in the plane 9—9 of FIG. 3 illustrating the transport drive mechanism of the present invention.
Figure 10:
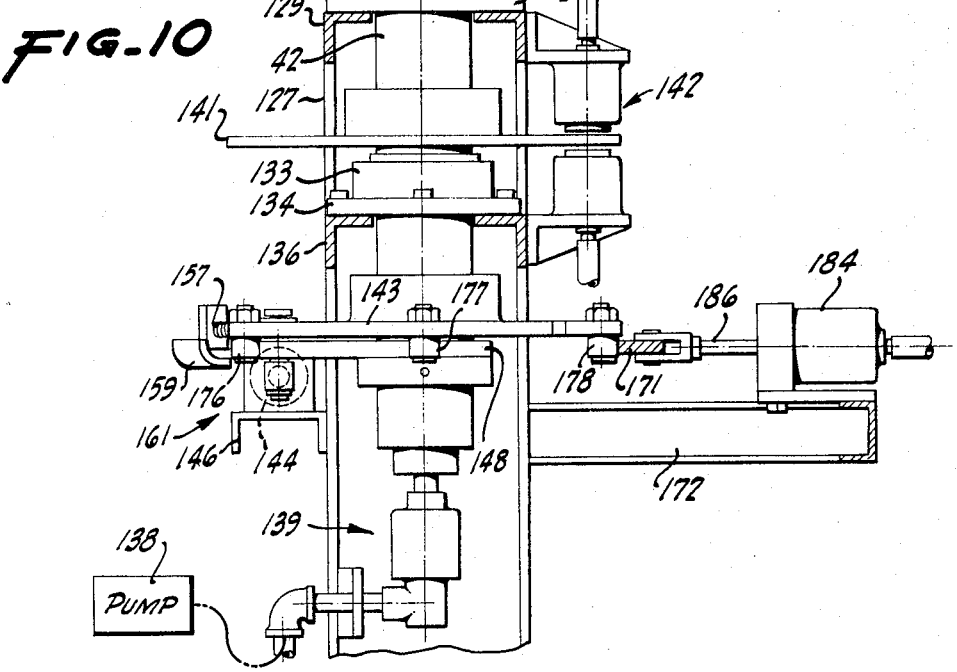
FIG. 10 is a vertical sectional view of the transport drive mechanism of the present invention taken in the plane 10—10 of FIG. 3.

Considering now a rotary indexing operation of the apparatus of the present invention, it is noted that FIG. 9 illustrates the apparatus immediately prior to a rotary motion being carried out. Application of air pressure to the drive cylinder 144 by operating the transport control means 34 will force the cylinder piston to the right in FIG. 9. This then rotates the drive bar 148 in a counterclockwise direction about the shaft 42 and the pawl 149 engaging a shoulder on the drive plate then rotates the drive plate. Thus, as the piston rod extends the pawl 149 will force the drive plate to rotate in a counterclockwise direction. The pawl is maintained in contact with the shoulder 151 by pressure of the spring 157 and the outer end of the piston rod moves about an arc centered on the axis of the shaft 42 as the drive bar 148 is rotated. It will be seen that the pawl pivots toward the axis of the shaft 42 as the cylinder 144 extends the piston therefrom into a final position illustrated in phantom in FIG. 9 at the position of shoulder 152. As the apparatus approaches this final position, the extension 159 rotated therewith comes into engagement with a pneumatic control valve 161 which is thereby operated to actuate the braking means 142 for slowing down the rotational motion. Return of the piston rod 147 is also controlled by the control means 34 so that the pawl 149 of the cylinder will engage the next shoulder then positioned as was shoulder 151 before the annular motion was performed. In order to insure that the central shaft 42 is precisely rotated 90° during each angular indexing operation, the present invention provides a precise locking mechanism at each index position. This mechanism is illustrated in FIGS. 9 and 10 as including a locking bar 171 pivotally mounted upon a lateral extension 172 of the upright frame 126. This locking bar 171 is disposed in a plane that is parallel to the plane of the drive plate 143, and is spaced slightly below same. The drive plate is provided with orthogonally disposed depending indexing or locking pins 176, 177, 178 and 179 adapted to be engaged one at a time by the locking bar 171. The side of the bar 171 toward the drive plate and shaft 42 has a shallow V-shaped surface 181 with a semicircular indentation 182 at the inner portion thereof. With the locking bar 171 urged radially inward of the drive plate 143, it will be seen that an indexing pin on the rotating drive plate will ride along the inclined surface 181 of the locking bar until it reaches the semicircular indentation 182 wherein the locking bar will seat on the indexing pin and lock the drive plate against further rotation in either direction. The locking bar is made sufficiently long that it always engages one indexing pin when it is pivoted toward the drive plate. Provision is made for controlling the pivotal motion of the locking bar by connecting a tension spring at 183 between the outer end of the locking bar and a portion of the lateral frame extension 172 on the opposite side of the bar from the drive plate. This spring will then exert a force to normally pivot the bar away from the drive plate into the position illustrated in solid lines in FIG. 9. The indexing bar is pivoted toward the drive plate by means of a pneumatic cylinder 184 mounted on the frame extension 172 and having an extensible piston rod 186 pivotally connected to the locking bar 171 with an elongated slot in the rod end, as shown. Application of air pressure to the cylinder 184 will thus be seen to pivot the bar 171 toward the drive plate toward the position illustrated in phantom in FIG. 9. With this arrangement then it is only necessary for the cylinder 184 to be actuated to urge the locking bar 171 radially inward of the drive plate 143 as the latter is being rotated by the drive piston 144. This then causes an indexing pin, such as pin 178, to engage the tapered or V-shaped surface 181 of the locking bar and to ride along this surface until it reaches the indentation 182, whereat the bar moves further radially inward of the drive plate and locks the drive plate from further rotational movement. In order for the drive plate to subsequently be again rotated, the air pressure in the cylinder 184 in released so that the spring 183 pivots the indexing bar away from the drive plate and frees the latter for further rotation. The cylinder 184 is operated by the valve 161 to move the locking bar toward the drive plate as the drive plate is being rotated so that the bar rides on an indexing pin until the latter enters the bar notch to lock the drive plate in position. Return of the drive piston releases the brake and locking bar.

It has been noted above that certain portions of the present invention are power operated and in the illustrated embodiment of the invention pneumatic power has been employed. Reference is made to FIG. 11 schematically illustrating the pneumatic system of the illustrated and described embodiment of the present invention. In this Figure, portions of the equipment are only schematically illustrated without physical connection therebetween and the central dashed line represents the air line through the center of the shaft 42. The air pump 138 will be seen to be connected through a combination of filter, regulator, oiler and gauges 201 to an inlet line 202 connecting to the swivel joint 139 at the end of the main shaft 42. The rotary drive and control mechanism may be directly operated by a branch inlet line 203 extending from the line 202 to the foot control valve 34. Air lines 204 and 206 extend from the valve 34 to opposite ends of the drive cylinder 144. The valve 34 is operated by a foot actuator 207 to apply high pressure air to one or the other end of the drive cylinder 144 which contains a double-acting piston. In the illustrated embodiment of the present invention the valve 34 normally applies pressure through line 204 to the outer end of the drive cylinder so that the drive mechanism including the piston rod and drive bar 148 are in the position as illustrated in FIG. 11. When an operator steps on the foot actuator 207, the valve 34 connects the air inlet line 203 to the air line 206 and this disconnects the air line 203 from the line 204. This then causes the drive cylinder to retract the piston and, consequently, the drive bar 148 will be rotated back into position whereat the pawl 149 engages the next shoulder or notch in the drive plate 143. Conventional provision is made for venting the end of the cylinder toward which the piston is moving. When the piston rod is retracted and the operator releases the valve actuator 207, air pressure will be applied to the line 204 and removed from line 206 so that the drive cylinder operates to extend the piston rod and rotate the apparatus.

Further with regard to control of the indexing or rotating apparatus of the present invention, there is provided an air pressure line 208 branching from the air line 204 and extending to the control valve 161. This then provides for air pressure at the valve 161 at all times air pressure is applied to the drive cylinder 144 to extend the piston rod therefrom. As stated above, the drive bar 148 carries a valve operator 159 which is adapted to engage an actuator of the valve 161 when the drive bar is rotated toward the position illustrated in FIG. 11. Thus air pressure is available at valve 161 when foot valve 34 is in normal position and is provided from valve 161 to the braking means 142 and the locking ar cylinder 184 when the valve 161 is operated by the actuator 159. Valve 161 is connected by an air line 211 to the braking means 142 and by line 212 to the locking bar cylinder 184. Application of air pressure to these lines 211 and 212 causes the braking means to engage the brake disc to slow and stop rotation of the apparatus and application of air pressure to the cylinder 184 causes the locking bar to be pivoted radially inward of the apparatus so as to engage an indexing pin on the drive plate and thus lock the plate in indexed position. It will be appreciated that the speed of operation and force of piston actuation may be controlled by the regulator.

Considering now the upper portion of FIG. 11, it is noted that each of the four portions or quadrants of the present invention are substantially identical other than particular actuating means or cam means located at station D and thus the following description is primarily limited to the description of pneumatic connections for a single station. There is provided an air line 216 extending from the pipe or manifold 137 atop the apparatus to the control means 29. These control means include a valve 86 operable to apply air pressure to either one of output air lines 83 or 84 extending to opposite ends of the cylinder 78 of the clamping means. Operation of the valve 86 may thus be performed to move the piston rod of the cylinder 78 in and out of the cylinder to close or open the clamping means. There is additionally provided an air line or connection 217 from the valve outlet line 84 to the cylinder 118 operating the back weight mechanism above the same carriage. It is noted that the cylinders 118 are illustrated in FIG. 11 with regard to the actual physical position or location so that the cylinder immediately adjacent each carriage is not the cylinder that operates the back weight mechanism above that carriage. In this respect, reference is made to FIG. 2 and the description relative thereto identifying the disposition and operation of the cylinders 118. It will thus be seen that actuation of the control means 29 by manually moving the actuator 88 thereof to an operated position applies pressure from the line 216 to the line 84 so that the piston 78 moves to lower the clamping means. Moving the actuator 88 to the opposite position will then apply air pressure to the line 83 to retract the clamping means and will also apply air pressure to the line 217 to raise or retract the back weight via piston 118.

With regard to the carriage or cradle pistons operable to open or close the carriage bed, it is noted that such a piston 61 is operated from a valve 221 having an air inlet line 222 connected to the manifold or air pipe 137 and a pair of outlet lines 223 and 224 extending to opposite ends of the cylinder 61. Normally the carriage bed plates are pivoted to a closed bed position and it is only at station D, i.e., the lower right hand portion of the rotating apparatus of FIG. 11, wherein carriage opening and closing occurs, and thus the valve 221 normally applies pressure through line 223 to the cylinder 61 to maintain the piston thereof retracted. Actuation of the valve 221 is accomplished at station D by means of a fixed cam 226 physically mounted upon the frame 126. The valves 221 are disposed beneath and preferably mounted upon the central plate 50 of the framework 41. As the framework and carriages and the like rotate, successive valves 221 will approach and come in contact with the cam 226 located at station D. The valve 221 carries a cam actuator 227 disposed thereon in position to be engaged by the cam 226 when the valve is rotated to station D.

Considering now operation of the carriage opening and closing mechanism, it is noted that, as the apparatus is indexed or rotated 90°, a carriage and the associated carriage piston valve 221 will rotate into position for engagement of the actuator 227 thereof with the cam 226. This then causes the valve 221 to reverse position and thus apply air pressure from line 222 through line 224 to the piston 61 for extending the piston rod thereof. This pivots the carriage bed into open position such as illustrated in FIG. 5, for example. As long as the particular carriage that has been opened remains at station D it will remain in this condition; however, upon further angular indexing of the apparatus, the associated control valve 221 will be moved away from the cam 226. This then allows the valve actuator 227 to resume normal position so that the valve 221 then cuts off air pressure to line 224 and applies air pressure to line 223 so as to retract the piston rod of cylinder 61. Consequently the carriage bed is closed or pivoted into a closed position as the carriage leaves station D. It is possible to release the clamping means of the present invention at station D via control means 29 either mechanically or pneumatically. Mechanical means to this end have been described above; however, it is noted that if the valve 86 is provided with a pilot control portion, then this pilot may be connected to the air line 224 between the valve 221 and cylinder 61 for accomplishing this same result. As the valve 221 is operated by the cam 226 the pressure in line 224 rapidly rises and this pressure may be employed through an air line 228 connected to the pilot portion of valve 86 for moving the valve to its opposite condition, i.e., wherein air pressure is applied through line 83 to the clamping means piston 78 for raising or releasing the clamping means. As this carriage leaves station D the valve 221 is reversed in position by moving away from cam 226 so that air pressure is then again applied to line 223 to close the carriage bed and the reduced pressure in line 224 allows the pilot to valve 86 to reset the condition wherein the valve actuator 88 will, upon physical movement, apply pressure through line 84 to the clamping means cylinder 78 for closing the clamping means.

In order to supply air to the bladders 96 and 97 in the carriages, there is provided a low-pressure manifold 231 atop the air pipe or line 137 and connected thereto through a regulator 232. This manifold is connected by air lines 107 to each of the valves 102 for applying air to the carriage bladders.

As previously noted, each of the carriages of the present invention are similarly constructed and operated at the successive stations. No attempt is made herein to identify each airline in FIG. 11 inasmuch as the lines to each of the carriages are the same.

Operation of the present invention has been described in connection with the description of mechanical details and pneumatic connections above. Consequently no separate description of operations is set forth herein. It is, however, briefly noted that insemination of turkeys, for example, at station C of the present invention may be accomplished in a relatively conventional manner. A turkey hen is delivered to station C whereat the bladders of the carriage are inflated by low pressure air to the extent desired by the operator through operation of the control means 32 so that the hen is properly conditioned for artificial insemination. Conventionally, a straw containing the semen is then employed by the operator for artificial insemination and in FIG. 1 there is only schematically illustrated apparatus 33 which might include straw filling and feeding equipment and possibly an air supply for semen ejection.

Although the present invention has been described with respect to a single preferred embodiment thereof, it will be appreciated by those skilled in the art that various modifications may be made within the scope of the invention.

What is claimed is:

1. Poultry handling apparatus comprising
a plurality of carriages mounted for controlled movement between successive stations arranged in a closed loop,
leg clamping means on each of said carriages with control means therefor to actuate the clamping means on the legs of a fowl disposed in a carriage,
back weight means controllably lowerable onto the back of a fowl disposed in a carriage whereby the fowl is retained therein for movement with the carriage, and
control means for controlling movement of said carriages between successive stations about said loop.

2. The apparatus of claim 1 further defined by said stations comprising a loading station, at least one operating station and a discharge station,
said carriages each having a pivotally mounted bed with control means therefor pivoting the bed downwardly to discharge a fowl disposed therein, and
actuating means at said discharge station releasing said clamping means and pivoting said bed downwardly thereat.

3. The apparatus of claim 2 further defined by the control means for moving said carriages being disposed at an operating station and adapted for actuation by an operator at such station to control carriage movement between stations.

4. The apparatus of claim 1 further defined by each of said carriages having a pair of inflatable bladders disposed on opposite sides thereof in position to engage the sides of a fowl retained therein and control means for such bladders located at at least one station to limitedly inflate the bladders for conditioning a fowl for artificial insemination.

5. The apparatus of claim 1 further defined by drive means for moving said carriages between stations and braking means automatically slowing the carriages as they approach a station.

6. The apparatus of claim 1 further defined by a central substantially vertical drive shaft having a framework mounted thereon and carrying said carriages for movement of the carriages about a circle between stations located on the circumference thereof, and
drive means engaging said shaft and controllably rotating the shaft through a predetermined angle for each carriage movement.

7. The apparatus of claim 2 further defined by said carriage beds including a pair of horizontally disposed abutting plates pivotally mounted to pivot downwardly from abutting relation to open the carriage bottom for discharge of fowl therefrom.

8. Poultry handling apparatus comprising
a rotary mounted framework carrying a plurality of poultry carriages for movement of the carriages about a substantially horizontal circle between successive stations,
each of said carriages having a bed adapted to have a fowl disposed thereon and the bottom of which is pivotable apart to open the carriage bed for discharge of a fowl downwardly therefrom,
leg clamping means disposed on each of said carriages in position to engage and controllably retain the legs of a fowl disposed on the carriage bed,
a plurality of back weights pivotally mounted one above each carriage for movement therewith and each movable downward into engagement with the back of a fowl on the associated carriage bed to further retain a fowl thereon, and
drive means moving said carriages between successive stations.

9. The apparatus of claim 8 further defined by manually operable control means at each carriage for actuating said leg clamping means, and
cam means disposed in fixed location relative to said rotary framework for operating a carriage bed to pivot same open and operating said leg clamp control means for releasing the leg clamping means to release and discharge poultry from each carriage arriving at said fixed location.

10. The apparatus of claim 8 further defined by at least a loading station, an operating station and a discharge station disposed in equally spaced separation about the circumference of said circle,
control means for said leg clamping means disposed at each of said carriages,
control means for said drive means disposed at an operating station for controllably rotating each of said carriages between successive stations about said circle, and
automatic release means disposed at said discharge station for releasing the leg clamping means and opening the bed of each carriage arriving at said discharge station.

11. The apparatus of claim 10 further defined by said automatic release means comprising a cam and cam follower disposed one at said discharge station and one at each carriage, said release means automatically returning each carriage bed to closed position as the carriage leaves the discharge station.

12. The apparatus of claim 8 further defined by first fluid cylinders connected between parts of each of said carriage beds for pivoting the beds closed and apart, a control valve for each of said first fluid cylinders with each of said valves having an operator, and cam means disposed at a fixed poultry discharge location on the circumference of said circle for engaging the control valve actuator of each carriage arriving thereat to open the bed at such location and close the bed leaving the location.

13. The apparatus of claim 8 further defined by a rotatably mounted substantially vertical shaft carrying said framework and having a peripherally notched drive plate secured thereto, said drive means including a pivotally mounted fluid cylinder having means engageable with drive plate notches and operable to rotate the drive plate and shaft through a predetermined angle for each cylinder actuation, and brake and locking means engaging said drive plate during drive plate rotation and stopping rotation at said predetermined angle of rotation.

14. The apparatus of claim 8 further defined by each of said carriages having two facing L-shaped sides with the bottom edges thereof abutting and disposed radially of said framework, said carriage having the outer end thereof open and being inclined downwardly at an angle to horizontal, and the leg clamping means of each carriage being disposed on said outer inclined portion of the carriage.

15. The apparatus of claim 8 further defined by said leg clamping means comprising a piston operated arm extending over a side of the carriage with a pad on the end within the carriage for engaging a pad within the carriage to controllably grip the legs of a fowl disposed in the carriage.

16. The apparatus of claim 15 further defined by a manually operable control valve for said leg clamping piston disposed at one side of the carriage adjacent the radially inner end of the carriage whereby an operator, gripping a fowl with one hand by the lower legs and the other by a forward portion of the fowl to place the fowl in a carriage, may operate the control valve by releasing the forward hand for same while retaining hold of the legs until the leg clamping means grip the legs.

17. The apparatus of claim 8 further defined by each of said carriages having a separable bottom, upright sides and at least an open top for receiving and releasably retaining a fowl therein longitudinally between said sides, a pair of flexible inflatable members disposed in facing relation one on each carriage side, and control means on each carriage for limitedly inflating said members for conditioning a fowl in a carriage for artificial insemination.

18. The apparatus of claim 17 further defined by said control means comprising a fluid valve having an actuator depending from the carriage in position for operation by knee pressure of an operator.

19. The apparatus of claim 8 further defined by a fluid piston connected to the pivotal mounting of each of said back weights and normally maintaining such weights in upwardly pivoted position, and control means closing said leg clamping means and releasing the piston for the back weight means of the same carriage whereby the weight pivots downwardly by gravity to rest on the back of a fowl disposed in the carriage and held by the leg clamping means.

* * * * *